(12) United States Patent
Brydon et al.

(10) Patent No.: US 10,015,497 B2
(45) Date of Patent: Jul. 3, 2018

(54) VIDEO QUALITY OF SERVICE MANAGEMENT AND CONSTRAINED FIDELITY CONSTANT BIT RATE VIDEO ENCODING SYSTEMS AND METHODS

(71) Applicant: ARRIS Enterprises, Inc., Suwanee, GA (US)

(72) Inventors: Neil W. Brydon, Mountain View, CA (US); Danny R. Hunt, Nevada City, CA (US); Sean T. McCarthy, San Francisco, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 214 days.

(21) Appl. No.: 14/948,227

(22) Filed: Nov. 20, 2015

(65) Prior Publication Data

US 2016/0080744 A1    Mar. 17, 2016

Related U.S. Application Data

(60) Division of application No. 14/304,454, filed on Jun. 13, 2014, now Pat. No. 9,225,980, which is a
(Continued)

(51) Int. Cl.
| | |
|---|---|
| *H04L 12/26* | (2006.01) |
| *H04N 19/146* | (2014.01) |
| *H04N 19/159* | (2014.01) |
| *H04N 19/46* | (2014.01) |
| *H04N 19/196* | (2014.01) |
| *H04N 19/149* | (2014.01) |
| *H04N 19/124* | (2014.01) |
| *H04N 19/152* | (2014.01) |
| *H04N 19/154* | (2014.01) |

(Continued)

(52) U.S. Cl.
CPC ......... *H04N 19/146* (2014.11); *H04N 19/10* (2014.11); *H04N 19/124* (2014.11); *H04N 19/149* (2014.11); *H04N 19/152* (2014.11); *H04N 19/154* (2014.11); *H04N 19/159* (2014.11); *H04N 19/184* (2014.11); *H04N 19/196* (2014.11); *H04N 19/46* (2014.11)

(58) Field of Classification Search
CPC .... H04N 19/124; H04N 19/154; H04N 19/10; H04N 19/159; H04N 19/147; H04N 19/15; H04N 19/152
USPC ............................... 370/226–240, 252–253; 375/240.01–240.11
See application file for complete search history.

(56) References Cited

U.S. PATENT DOCUMENTS

| | | |
|---|---|---|
| 6,330,532 B1 | 12/2001 | Manjunath et al. |
| 7,003,449 B1 | 2/2006 | Absar et al. |

(Continued)

*Primary Examiner* — Mounir Moutaouakil
(74) *Attorney, Agent, or Firm* — Thomas A. Ward

(57) ABSTRACT

A constrained variable rate coding technique limits the number of bits used in an encoding process. A quality setting indicates a maximum level of quality to be used in the encoding process which limits the number of bits used in the encoding process. A bandwidth reclamation factor which indicates an amount of bandwidth to conserve may also be used with the quality setting. The constrained variable rate coding technique using a lower quality encoding process for less complex video data and a higher quality encoding technique for higher quality video data.

1 Claim, 20 Drawing Sheets

Related U.S. Application Data continuation of application No. 11/859,445, filed on Sep. 21, 7, now Pat. No. 8,780,717.

(60) Provisional application No. 60/846,369, filed on Sep. 21, 2006.

(51) Int. Cl.
*H04N 19/10* (2014.01)
*H04N 19/184* (2014.01)

(56) References Cited

U.S. PATENT DOCUMENTS

| | | |
|---|---|---|
| 7,031,542 B2 | 4/2006 | Takahashi et al. |
| 7,634,413 B1 | 12/2009 | Kuo et al. |
| 9,706,234 B2* | 7/2017 | Rieger .................. H04H 20/42 |
| 2002/0124258 A1* | 9/2002 | Fritsch ............... H04N 7/17336 |
| | | 725/88 |
| 2005/0084007 A1 | 4/2005 | Lightstone et al. |
| 2005/0195901 A1 | 9/2005 | Pohjola et al. |
| 2006/0067362 A1* | 3/2006 | Ramakrishnan ..... H04N 21/235 |
| | | 370/468 |
| 2006/0130107 A1* | 6/2006 | Gonder ............. H04L 29/06027 |
| | | 725/110 |
| 2009/0004998 A1 | 1/2009 | Aaron |
| 2010/0125455 A1 | 5/2010 | Wang et al. |

* cited by examiner

VIDEO QUALITY OF SERVICE MANAGEMENT AND CONSTRAINED FIDELITY CONSTANT BIT RATE VIDEO ENCODING SYSTEMS AND METHODS

CLAIM FOR PRIORITY

This application is a divisional of application Ser. No. 14/304,454, filed on Jun. 13, 2014, which claims benefit of application Ser. No. 11/859,445, filed Sep. 21, 2007, which also claimed the benefit of U.S. Provisional Application No. 60/846,369 filed on Sep. 21, 2006.

The present invention relates generally to methods, systems and techniques for video processing, and more particularly relates to methods, systems and techniques for video encoding with bandwidth and quality constraints. The present invention also relates generally to methods, systems, and techniques for managing quality of service (QoS), and more particularly relates to QoS for video transport and video telecommunications.

BACKGROUND OF THE INVENTION

Prior art video encoders are designed to operate in one of two distinct ways: variable bit rate mode (VBR) or constant bit rate mode (CBR) mode. In VBR mode, video quality stays constant while bit rate varies. Conversely, in CBR mode, video quality varies while bit rate remains constant. VBR mode may thus be thought of as constant quality mode, and CBR may thus be thought of a variable quality mode.

In at least some implementations, VBR operation has been achieved in prior art video encoders by setting quantization parameters to a constant level that result in effectively constant perceived video quality. Prior art VBR encoding also incorporates a buffering stage that temporarily stores bits before transmitting them over a communications channel. The incorporation of a video buffer in VBR mode enables the encoder to schedule the delivery time of video bits to decoders/receivers in a specified manner. In some implementations, VBR operations can be thought of as VBR with a cap (capped VBR). In capped VBR mode, bit rate is allowed to vary but it is not allowed to exceed a predetermined maximum. Capped VBR behavior can be achieved by temporarily buffering bits and then later transmitting them at the maximum bit rate, thereby limiting the maximum bit rate without impacting video quality, though at the price of increased end-to-end delay.

CBR operation has typically been achieved in prior art video encoders by varying quantization parameters in response to a rate-control feedback signal. Prior art CBR encoding incorporates a buffer that stores bits for transmission in order to fulfill certain timing requirements between the encoder and decoder/receiver. In CBR mode, bits are removed from the video buffer at a constant rate and then transmitted. The rate-control feedback signal, which may be some measure of the fullness of the video buffer, is generally designed to vary the rate at which bits are produced and deposited in the video buffer. The feedback signal is such that as buffer fullness decreases, quantization parameters, for example, are adjusted to increase encoding precision and thus increase the bit rate into the video buffer. Conversely, the feedback signal is such that an increase in buffer fullness results in an adjustment of quantization parameters, for example, that is designed to reduce encoding precision and consequent bit production. The feedback is typically designed to counteract the constant outflow from the video buffer. For example, the feedback signal may be designed so as to maintain the output buffer at some predetermined fractional level of fullness. In at least some embodiments, the feedback signal may be designed to maintain the output buffer level so that the end-to-end delay between encoder and decoder satisfies some predetermined timing constraints. In some situations, the encoder may not be able to produce enough bits to maintain target buffer fullness because particular video sequences require very few bits to encode at best quality. In such situations, the outflow of bits from the video buffer may fall below the target bit rate and the resulting bit stream may appear similar to capped VBR, though video quality will correspond to the maximum achievable by the encoder.

VBR mode is typically preferred in applications that benefit from constant quality and which have no practical imposed bit rate limits, such as DVD authoring. CBR mode is typically preferred in applications that have bandwidth limitations, such as video over DSL. In an ideal world, an encoder would be able to produce constant quality in applications that have hard bandwidth limitations.

A central principle of video encoding is that, at any given level of video quality, video sequences with significant random detail and/or motion require more bits to encode than do sequences with more predictable spatial and temporal detail. Video sequences that contain a significant amount of unpredictable details may be considered to be difficult to encode. In VBR mode, it is not uncommon that the most difficult sections of a video sequence would result in peak bit rates that are several times greater than average bit rate.

Another principle of video encoding is that encoded data must be buffered to satisfy certain timing requirements between encoder and decoder. Video encoding and decoding systems are typically designed so that the end-to-end timing requirements between encoder and decoder satisfy some predetermined interval. It will be appreciated that, for a fixed end-to-end transmission delay, a larger buffer would be required for difficult-to-encode video than would be required for easy-to-encode video. Conversely, for a fixed-size buffer, end-to-end transmission delay would be longer for difficult-to-encode video than it would be for easy-to-encode video.

A disadvantage of VBR in video communications is that channel capacity must be sized to accommodate peak bit rates. In such situations, a large fraction of allocated bandwidth is routinely wasted. The disadvantage is made worse in cases in which several video streams share a common communications channel because the channel must be large enough to accommodate simultaneous occurrence of peak bit rate for each video stream. Thus, the maximum number of channels that could be supported is a function of the peak VBR bit rate and the total channel capacity. Capped VBR could address some of the disadvantages of VBR, but at the expense of larger video buffers and consequently increased end-to-end transmission delay.

A disadvantage of CBR mode in video communications is that perceived video quality can fluctuate noticeably. In at least one sense, CBR mode preferentially boosts the quality of easy-to-encode video sequences and systematically deteriorates the quality of hard-to-encode sequences such as sports video and action scenes.

In some applications, such as satellite and cable, where a predetermined number of particular video streams share a common communications channel, a method known as statistical multiplexing has been used to overcome some of the disadvantages of VBR and CBR. In at least one sense, statistical multiplexing can be thought of as a hybrid of VBR and CBR. Statistical multiplexing can be thought of as combining multiple VBR video streams in such a way as to achieve a constant bit rate overall. Prior art implementations of statistical multiplexing typically incorporate a pool of independent encoders, a controller, and a multiplexer in which the various video streams are combined and retransmitted. The controller typically receives signals from each encoder in the pool, processes the signals to determine the fraction of total bandwidth that will be allocated to each encoder, and then sends some signal to each encoder by which each encoder can determine its particular bandwidth allocation. The downstream signal from each encoder typically provides a measure of how many bits would be required to encode its video at a particular quality; e.g. a proxy for the bit rate that would be required in VBR mode at a particular quality setting. The upstream signal from the controller to each encoder can be thought of as an adjustment to the CBR bit rate setting of the target encoder. As a result, statistical multiplexing balances the bit rates and, indirectly, the quality settings of a pool of encoders with the objective of making most efficient use of a common communications channel. In at least some implementations, statistical multiplexing enables more video streams to share a common channel than would be the case for VBR. In some implementations, statistical multiplexing can also reduce quality fluctuations because bits can be borrowed from simple video streams and allocated to difficult video streams, thereby smoothing quality variations.

Statistical multiplexing and CBR mode share a common disadvantage: each makes sharing of communications channels with non-video services less efficient. In some applications, such as IPTV and some cable applications, it is desirable to bundle video, voice telephony, and Internet access together and have all services share bandwidth simultaneously. In CBR implementations, voice telephony and Internet data services would be allocated a fixed portion of the total channel bandwidth; i.e. the portion of total bandwidth not allocated to one or more CBR video streams. However, voice telephony and Internet data services are naturally bursty. The corresponding non-video communications channels would need to be sized to accommodate peak bit rates. As a result, a portion of non-video bandwidth would be routinely wasted because voice and data services would most often require less than peak bit rates. Statistical multiplexing applications suffer the same disadvantages because the overall bandwidth allocated to the multiplexed video streams is constant: i.e., equivalent to CBR mode.

Video communications would be improved if bit rate and video quality were regulated together. One advantage would be lower average bit rates than could be achieved by VBR or capped VBR. Another advantage would be a reduction in the visual quality fluctuations that are observed in CBR mode. Another advantage would be the ability to increase the number of video streams that could be accommodated in a common communications channel, compared to VBR implementations. Still another advantage would be the ability to share video and non-video services, such as voice telephony and Internet access, in a common communications channel more efficiently.

Video communications would be further improved if a hybrid VBR/CBR encoding mode were implemented in individual encoders without the need for a separate controller such as, for example, the separate controller in statistical multiplexing applications. An advantage would be the ability to deploy video encoders either individually or as members of a pool of encoders and achieve at least some of the advantages of traditional statistical multiplexing without the cost of a separate controller.

Video communications would be further improved if an encoder produced metadata that could be processed to produce indications of video bit rate and quality. An advantage, particularly in packet-based networks, would be the ability to manage quality-of-service at various points within a network, including network endpoint, such as subscriber premises.

DETAILED DESCRIPTION OF THE INVENTION

Figure 1:
FIG. 1 shows a typical in system block diagram form several aspects of an embodiment of a typical video encoder.

The present invention is a video encoding implementation that may be considered of as a hybrid between VBR and CBR. In the present invention both bit rate and video quality are actively regulated. In the present invention VBR and CBR functionality is incorporated into individual encoders, which eliminates the need for a separate controller. The present invention incorporates both bit rate and video quality limits such that the present invention will not produce a bit rate greater than a predetermined bit rate and it also will not produce video having a video quality greater than a predetermined visual fidelity, where visual fidelity may be described using various methodologies described below. As such, the present invention may be thought of as constrained-fidelity constant bit rate (CF-CBR). It may also be thought of as constrained fidelity capped bit rate (also CF-CBR). In at least some implementations, the present invention may also be thought of as variable bit rate with a cap (capped VBR).

The present invention delivers new benefits to video transport by any of several methods, including: terrestrial broadcast (over the air), satellite; cable television; fiber optic; copper wire; Internet; and other communications methods. It also provides new benefits to several applications, including: digital broadcast, point-to-point (back haul), IPTV, switched digital video, video conferencing, digital video recording, video on demand, Internet streaming, and other information, entertainment, and video applications.

The present invention delivers to video communications, including IPTV, at least some of the benefits of a statistical multiplexing. CF-CBR allows the video rate to be reduced during less complex sections of video, thereby freeing up bandwidth for other services such as data services. One aspect of the present invention is to identify low complexity content which is comparatively easy to encode and therefore requires less bandwidth to provide acceptable quality. When such content is found, the present invention limits encoding precision to achieve a particular predetermined quality, but not better. One result is that the quality variations of the encoded video are reduced and, thus, less noticeable. Another result is that the rate of bits input to the buffering stage is reduced to a level below what it would have been without such a fidelity constraint. One consequence is that the bit rate output from the buffering stage may drop below its maximum rate, freeing additional capacity, or bandwidth, in the channel that can be used to augment data services. In this manner, additional bandwidth can be provided for video services, while maintaining at least nominal bandwidth for traditional services. One advantage of the present invention is that it tends to produce larger, longer lasting bit rate drops than is typical of capped VBR implementations. In at least some CF-CBR implementations, bandwidth reclamation on the order of 20% or greater is possible with no perceived drop in the quality of the video service The CF-CBR system of the present invention is effectively a hybrid implementation. The system behaves as a VBR implementation for simple video sequences and as a CBR for difficult video sequences. In a first implementation, the CF-CBR control parameters include a maximum bit rate and a bandwidth reclamation strength. The maximum bit rate establishes the bit rate that is not to be exceeded, even for complex scenes such as those with substantial motion. Bandwidth reclamation strength is a factor related to how aggressively bandwidth is to be reclaimed, such that when the CBR stream of the present invention exceeds a certain quality threshold, the system will produce a variable bit rate transport stream output having constant quality. The bandwidth reclamation strength can be configured in any of a variety of ways, including sliding scale, fixed increment, or any other suitable approach. In one implementation, the bandwidth reclamation strength can be a pull-down menu of five increments, for example. In at least some implementations, the bandwidth reclamation factor may be thought of as a means of specifying the maximum encoding quality. In at least some other implementations, the maximum encoding quality can be a primary control parameter and the bandwidth reclamation factor may be thought of as derived information.

In addition, for at least some embodiments, the ability to enable null packets can be included for, for example, applications that want to fix the bit rate at one point in the network so that bandwidth reclamation can be performed in downstream devices. In at least some implementations, video bit rate can be monitored so that an indication of video bit rate might be supplied to other devices, for example.

While the aspects of the invention are described in detail with respect to encoding, such description is for explanation purposes only. Those of skill in the art will appreciate that they apply equally to decoding of encoded data. The operation of encoding and decoding are generally opposite operations and may be generally referred to as simply coding.

Referring now to FIG. 1, which depicts a video encoder 100, an incoming video stream 105 is supplied to a core encoder 110. The output of the core encoder 110 is typically supplied to a buffer 115. A scheduler 120 typically retrieves encoded data from the buffer, processes it, and emits it as part of an output stream 125. The incoming video stream typically includes a series of frames, or images. The output stream typically includes compressed data and metadata that can include information that can be used, for example, to reconstruct compressed data or, alternatively, to route the output stream through communications networks or, as a further alternative, to manage quality of service.

The core encoder typically includes a processor executing one or more functions, including: motion estimation; spatial estimation; data transformations; quantization; complexity estimation; visual distortion estimation; and rate-control.

Complexity estimation can be based on one or more indicia, including: spatial detail within an image; differences in spatial detail between images; correlation of motion vectors; quantization parameters; color detail; buffer fullness; visual distortion; or other statistical metrics.

Visual distortion can be based on one or more indicia, including: quantization parameters; motion vectors; peak signal-to-noise (PSNR); mean absolute difference (MAD); variance of encoded residuals; the output of a human visual system model (HVS model); or other statistical metrics.

Figure 2:
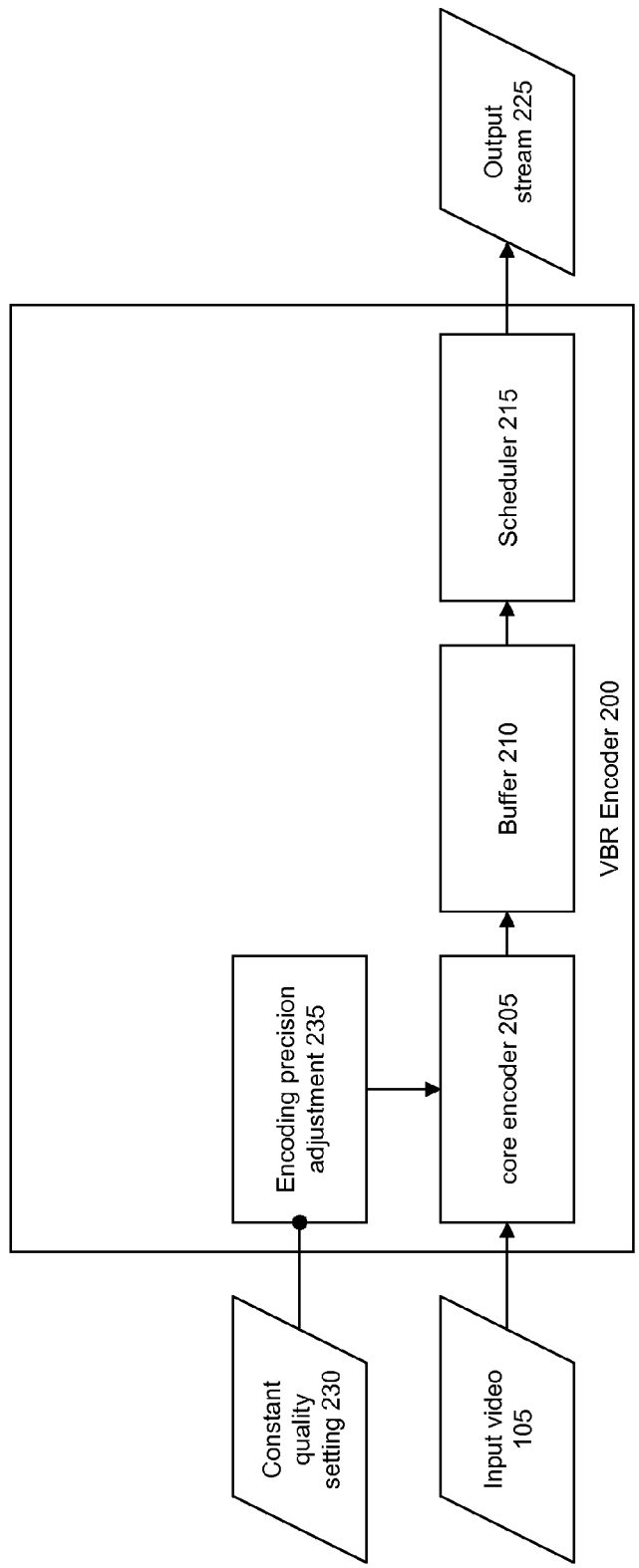
FIG. 2 shows a typical in system block diagram form several aspects of an embodiment of a typical video VBR encoder.

Referring next to FIG. 2, a VBR video encoder 200 is shown in block diagram form that typically incorporates a core encoder 205, buffer 210 and scheduler 215 that perform functions on an incoming video 220 to produce an output video stream 225. In addition, a video quality setting 230 can be supplied to an encoding precision adjustment module 235, which supplies an encoding precision signal to the core encoder that regulates the functions performed by the core encoder.

Figure 3:
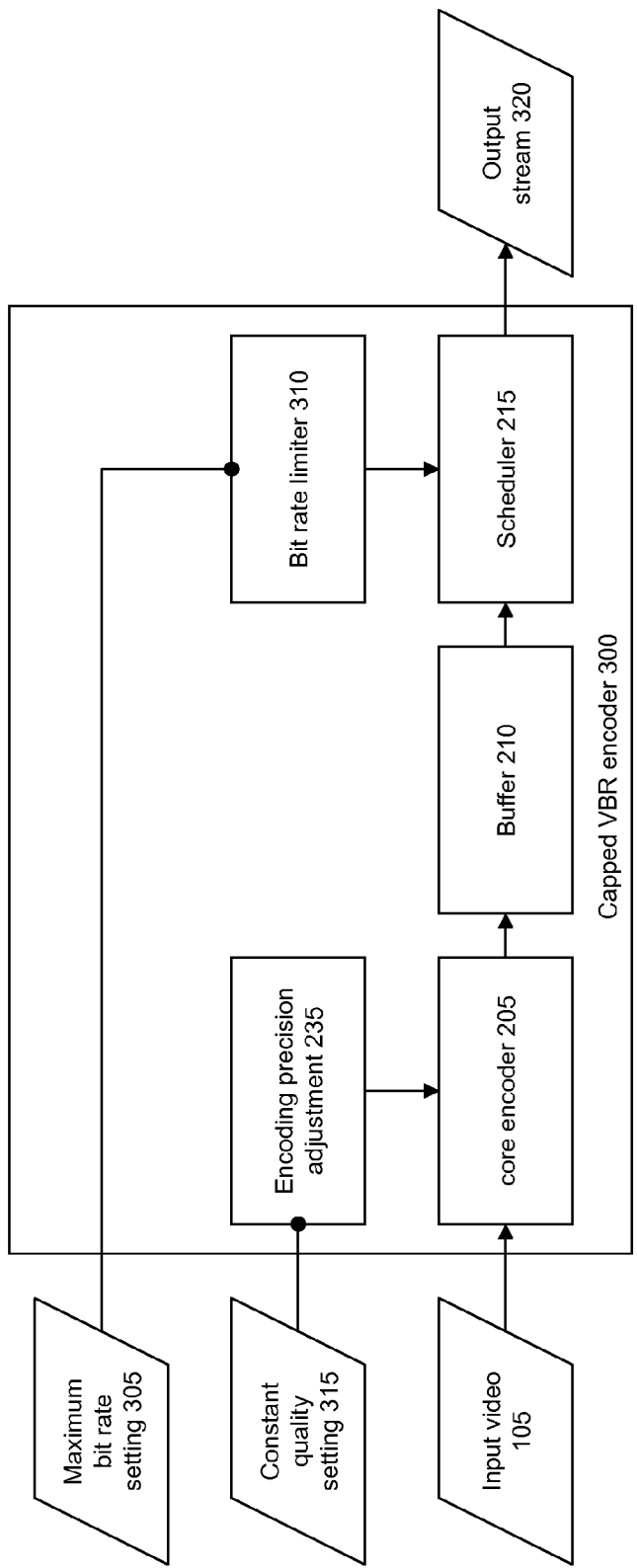
FIG. 3 shows a typical in system block diagram form several aspects of an embodiment of a typical video capped-VBR encoder.

Referring now to FIG. 3, there is depicted a capped VBR video encoder 300 that typically incorporates the elements of a VBR encoder (where like elements from FIG. 2 are designated with the same reference numerals) with the addition of a bit rate limiter 305 that regulates the rate at which data moves from the buffer to the output channel in accordance with a maximum bit rate setting 310. In capped VBR operation, the maximum bit rate setting and the constant quality setting 315 are typically distinct control parameters which together affect the character of the output stream 320. If the rate at which bits are produced by the core encoder is greater than the maximum bit rate, the excess bits are typically stored in the buffer 210.

Figure 4:
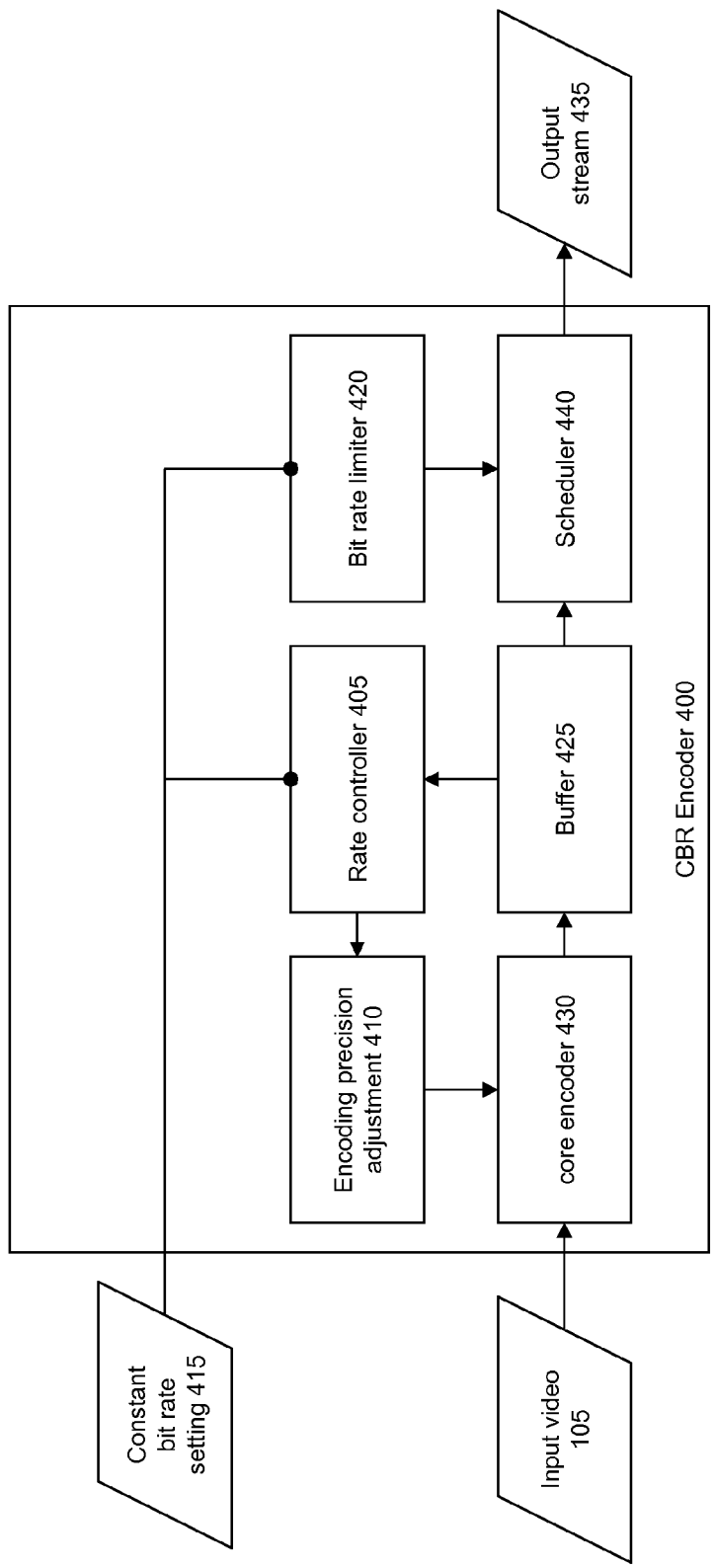
FIG. 4 shows a typical in system block diagram form several aspects of an embodiment of a typical video CBR encoder.

Referring next to FIG. 4, a CBR encoder 400 is depicted that incorporates some elements typical of a capped VBR encoder. A CBR encoder differs from a capped VBR encoder in that the video quality setting is internal and typically is generated by a rate-control algorithm or what may be thought of as a rate controller 405 that controls an encoding precision adjustment 410. In turn, the encoding precision adjustment provides an input to the core encoder 205. In CBR implementations the independent control parameter may be thought of as a constant bit rate setting 415 which is supplied to both the rate controller 405 and a bit rate limiter 420. A rate control algorithm may be thought of as a system of monitoring or predicting bit rate in conjunction with a system of limiting bit rate. If the rate at which bits are produced by the core encoder is greater than the target bit rate, the excess bits may be stored temporarily in the buffer 425 and a signal may be fed back to the encoding precision adjustment 410 (through, for example, the rate controller 405), which would reduce the quality setting so that the core encoder 430 would tend to produce fewer bits. If the rate at which the core encoder 430 produces bits is too low to maintain the target bit rate, then a feedback signal may be sent to the encoder precision adjustment 410 to increase coding quality so that the core encoder would tend to produce more bits. It will be appreciated that the CBR method will tend to minimize bit rate fluctuations associated with output stream 435 (again through an intervening scheduler 440) by varying the quality of encoding.

Figure 5:
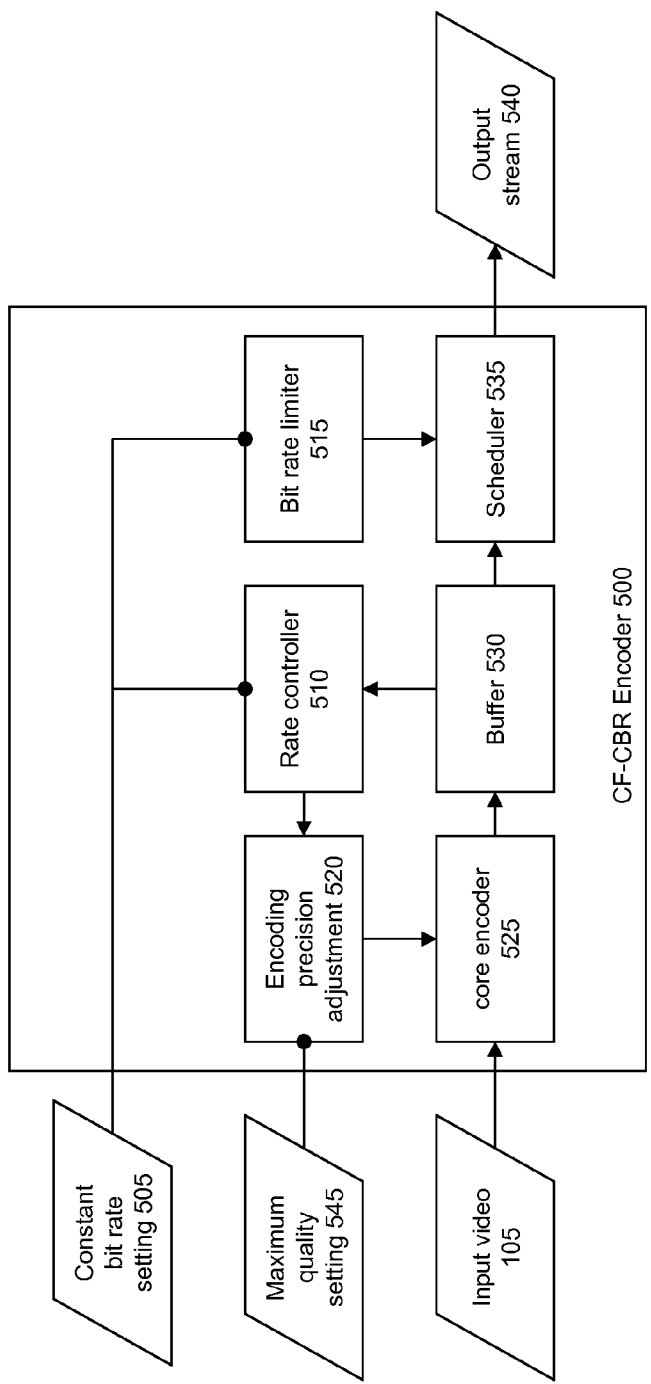
FIG. 5 shows in system block diagram form several aspects of an embodiment of a system in accordance with the invention.

Referring now to FIG. 5, depicted therein is an embodiment of a system in accordance with the present invention that incorporates elements of both a CBR encoder and a capped VBR encoder in what the inventors have designated generally as a CF-CBR Encoder 500. A constant bit rate setting 505 sets the performance of a rate controller 510 and a bit rate limiter 515, and the rate controller 510 in turn provides an input to an encoding precision adjustment 520. The encoding precision adjustment 520 provides a control signal to a core encoder 525, which also receives the video input 105. As with the prior figures, a buffer 530 supplies video data to a scheduler 535, but also provides a feedback signal to the rate controller 510. The scheduler receives a control signal from the bit rate limiter 515, and provides as its output the video stream 540.

If the rate at which bits are produced by the core encoder 505 is greater than a preset maximum bit rate set by the then this embodiment of the present invention will function as if it were a CBR encoder. If the rate at which the core encoder 525 produces bits is too low to maintain the maximum bit rate, then a feedback signal can be sent to the encoder precision adjustment, which would increase coding quality up to a certain point preset by the maximum quality setting 545. It will be appreciated that this embodiment of the present invention will tend to minimize bit rate fluctuations associated with output stream by varying the quality of encoding in situations in which the core encoder tends to produce bits at a greater than the maximum selected output rate. It will also be appreciated that this embodiment of the present invention will also tend to minimize quality fluctuations associated with the encoded video by varying bit rate in situations in which the core encoder produces bits at less than maximum selected output rate. It may also be appreciated that the maximum quality setting 545 may be thought of as a form of bandwidth reclamation.

Figure 6:
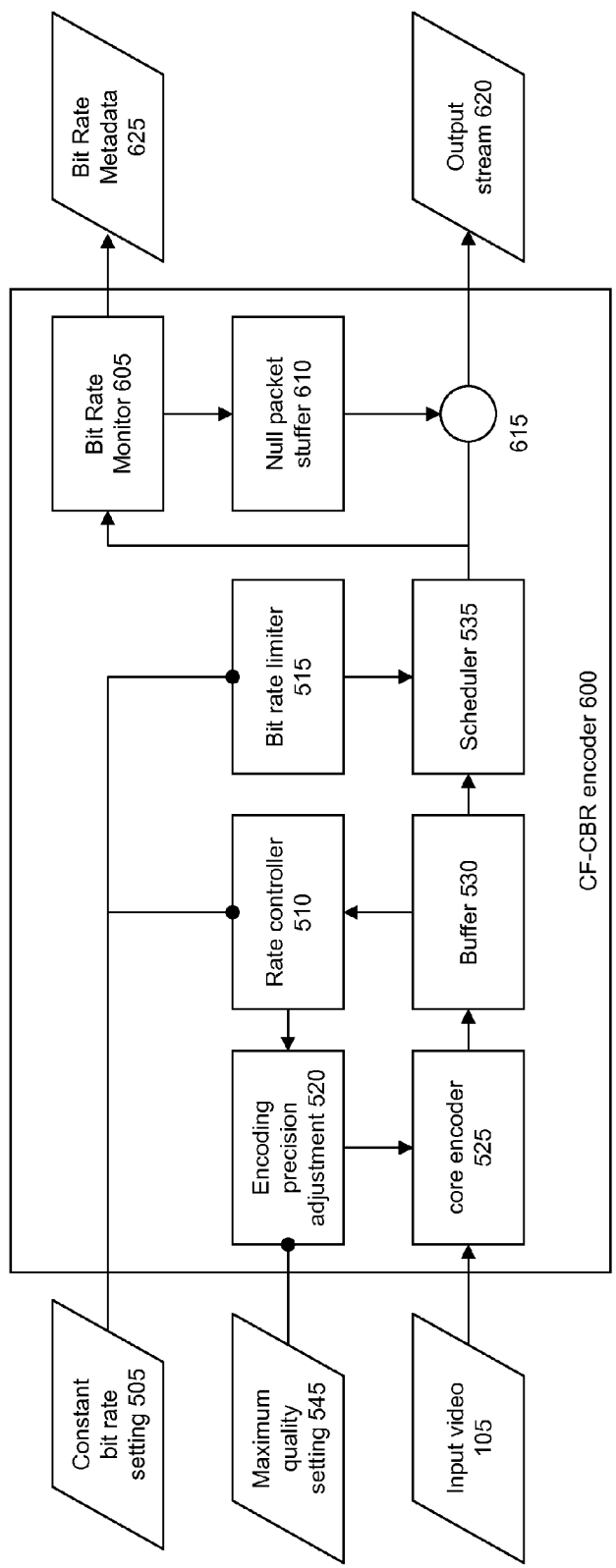
FIG. 6 shows in system block diagram form several aspects of an embodiment of a system in accordance with the invention.

FIG. 6 depicts an embodiment of the invention wherein the encoder 600 is similar to many aspects of the encoder 500 of FIG. 5, as indicated by like numerals for substantially similar elements, but additionally incorporates a bit rate monitor 605 and a null packet generator, or 'stuffier' 610. An input to the bit rate monitor 605 is supplied from the output of the scheduler to produce an indication of the video bit rate. The null packet generator 610 is supplied its input from the output of the bit rate monitor 605, which regulates the rate of null packet generations. The output of the null packet generator 610 is combined at 615 with the video information supplied from the scheduler 535 to yield an output stream 620. It will be appreciated by those skilled in the art that a null packet generator that is regulated in such a manner could produce a null packet bit rate that is equal to the video bit rate reclamation, so that the combined null packet and video bit rates would result in a constant output bit rate. It will also be appreciated that the bit rate monitor can supply data or indicia to other devices, such as metadata 625, and can operate in the absence of null packet generator.

Figure 7:
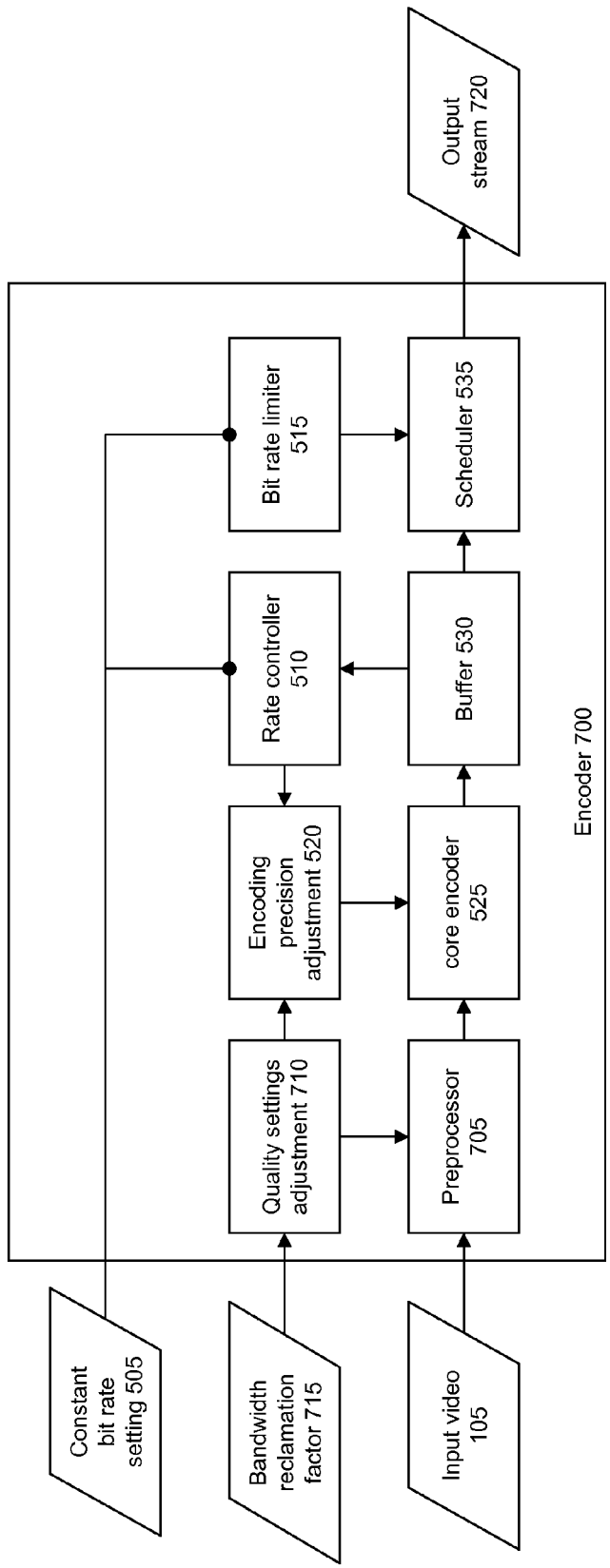
FIG. 7 shows in system block diagram form several aspects of an embodiment of a system in accordance with the invention.

Referring next to FIG. 7, an embodiment is depicted in which an encoding system in accordance with the invention, indicated generally at 700, incorporates a preprocessing module but is otherwise similar to the embodiment of FIG. 5 such that substantially similar modules are indicated by like reference numerals. The preprocessing module, or preprocessor, 705 operates on input video to supply a modified video to the core encoder 525. Depending upon the implementation, the preprocessor performs functions that include: noise reduction; horizontal and vertical scaling; color transformations; field and frame conversion; telecine and inverse telecine; frame rate conversion; de-interlacing and interlacing; spatial and temporal filtering; and other signal processing functions. It will be appreciated that the rate at which bits are produced by the core encoder 525 depends on the spatial, temporal, and chromatic details of the inputted video.

It will also be appreciated that the preprocessor 705 can modify spatial, temporal, and chromatic details so as to change the rate at a core encoder produces bits. It will also be appreciated that the strength and kind of preprocessing can be varied as a function of a quality setting to produce greater or lesser bandwidth reclamation. It will also be appreciated that, depending upon the implementation, a quality settings adjustment module 710 can be included to process a bandwidth reclamation factor 715 and thereby to supply separate control parameters to the encoding precision adjustment 520 and the preprocessor 705. In this manner, coding efficiency can be regulated in a coordinated manner through several processing operations. It will be appreciated that the quality setting adjustment module 710 can also be supplied indications of bit rate such as indicia produced by a bit rate monitor, for example, such as bit rate monitor 605 (FIG. 6). Alternatively, indication of bit rate can be supplied by a 'buffer fullness monitor', which can be a component of the rate controller 510 and which monitors or models the relative fullness of buffer 530. Indication of bit rate can also be supplied by external downstream devices such as, for example, statistical multiplexers, bit rate monitors, management systems, or other measurement and control systems. As with FIG. 5, the output stream 720 for this illustrated embodiment is provided by the scheduler 535.

Figure 8:
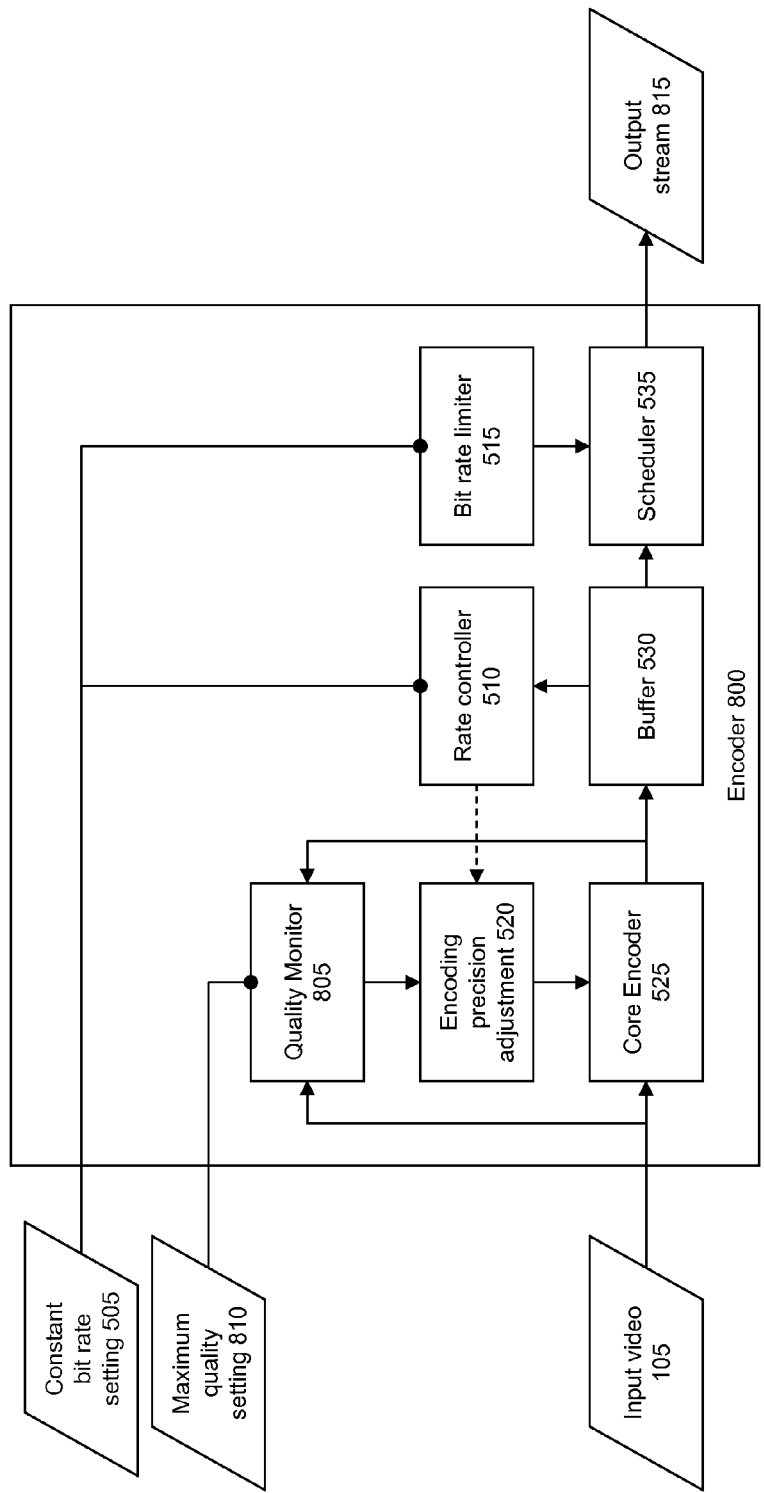
FIG. 8 shows in system block diagram form several aspects of an embodiment of a system in accordance with the invention.

FIG. 8 depicts an embodiment of the invention, indicated generally at 800, that is similar to FIG. 5, but incorporates a video quality monitor 805. Again, substantially similar modules are indicated by like reference numerals. The quality monitor can include a video decoder and a system for estimating or predicting visual distortion. The quality monitor operates on all or some portions of input video and encoded video to produce a metric of quality, which is compared to a maximum quality setting 810 in order to supply a control signal to the encoding precision adjustment. If the encoded quality is greater than the maximum quality setting, the control signal will cause a decrease in encoding precision. If the encoded quality is less than the maximum quality setting, the encoding precision will be controlled by the feedback signal from the rate control mechanism 510. As with FIG. 5, the output video stream 815 is provided from the output of the scheduler 535.

Figure 9:
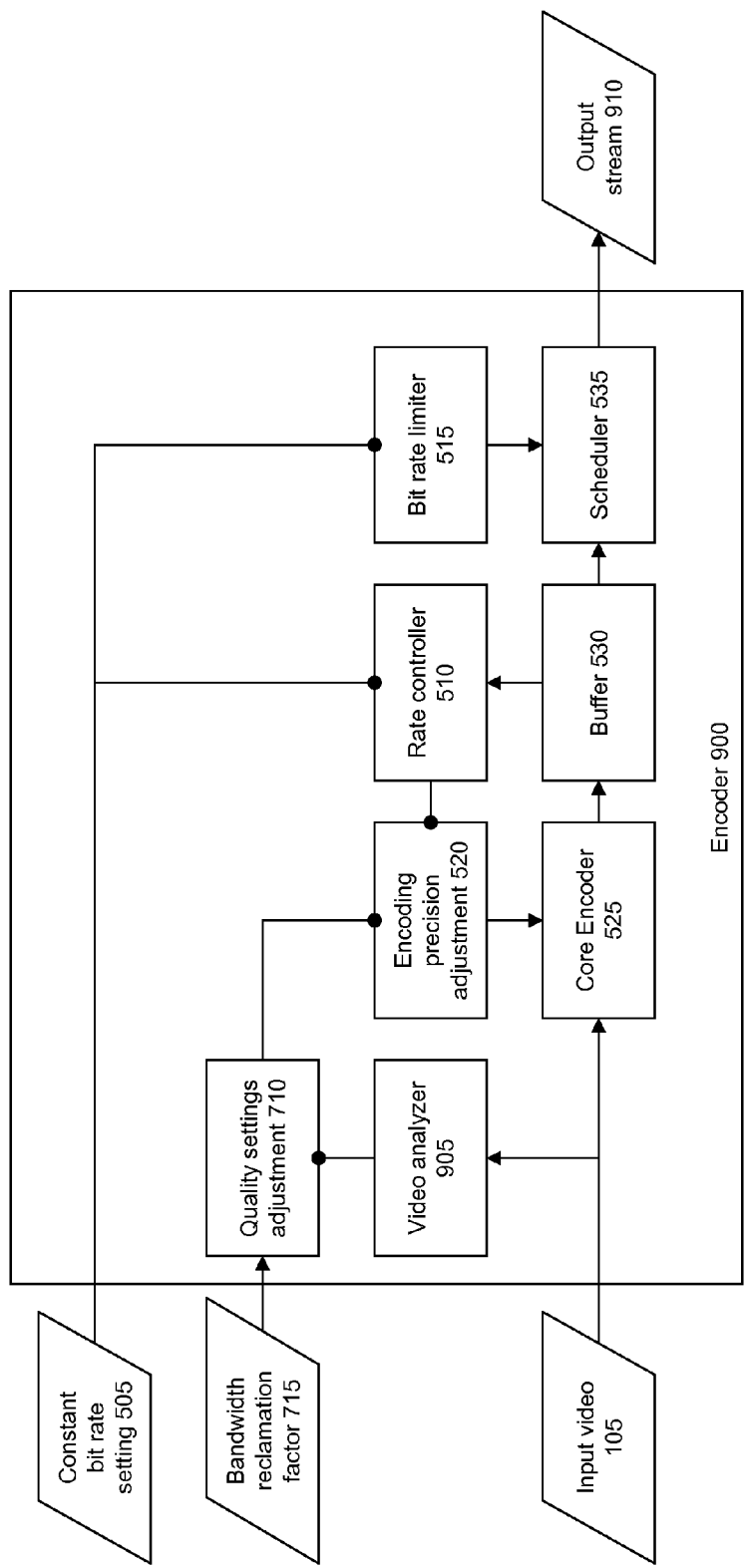
FIG. 9 shows in system block diagram form several aspects of an embodiment of a system in accordance with the invention.

FIG. 9 depicts an embodiment of the invention, indicated generally at 900, that incorporates a video 905 analyzer but is otherwise similar to the CF-CBR implementation of FIG. 7. The video analyzer can perform functions that include: visual complexity analysis; visual significance analysis; human visual system modeling; bit rate prediction analysis; noise analysis; horizontal and vertical scaling analysis; color analysis; telecine and inverse telecine analysis; frame rate conversion analysis; de-interlacing and interlacing analysis; spatial and temporal filtering analysis; spatial and temporal frequency analysis; and other signal processing analysis. It will be appreciated that the rate at which bits are produced by the core encoder depends on the spatial, temporal, and chromatic details and visual significance of the inputted video. It will also be appreciated that the visual details of video vary from region to region within a picture and from time to time. The output of the video analyzer 905 can, in some implementations, supplied to quality setting adjustments 710 to be processed to regulate encoding precision adjustment 520. Similar to with FIG. 7, an output video stream 910 is provided by Scheduler 535.

Figure 10:
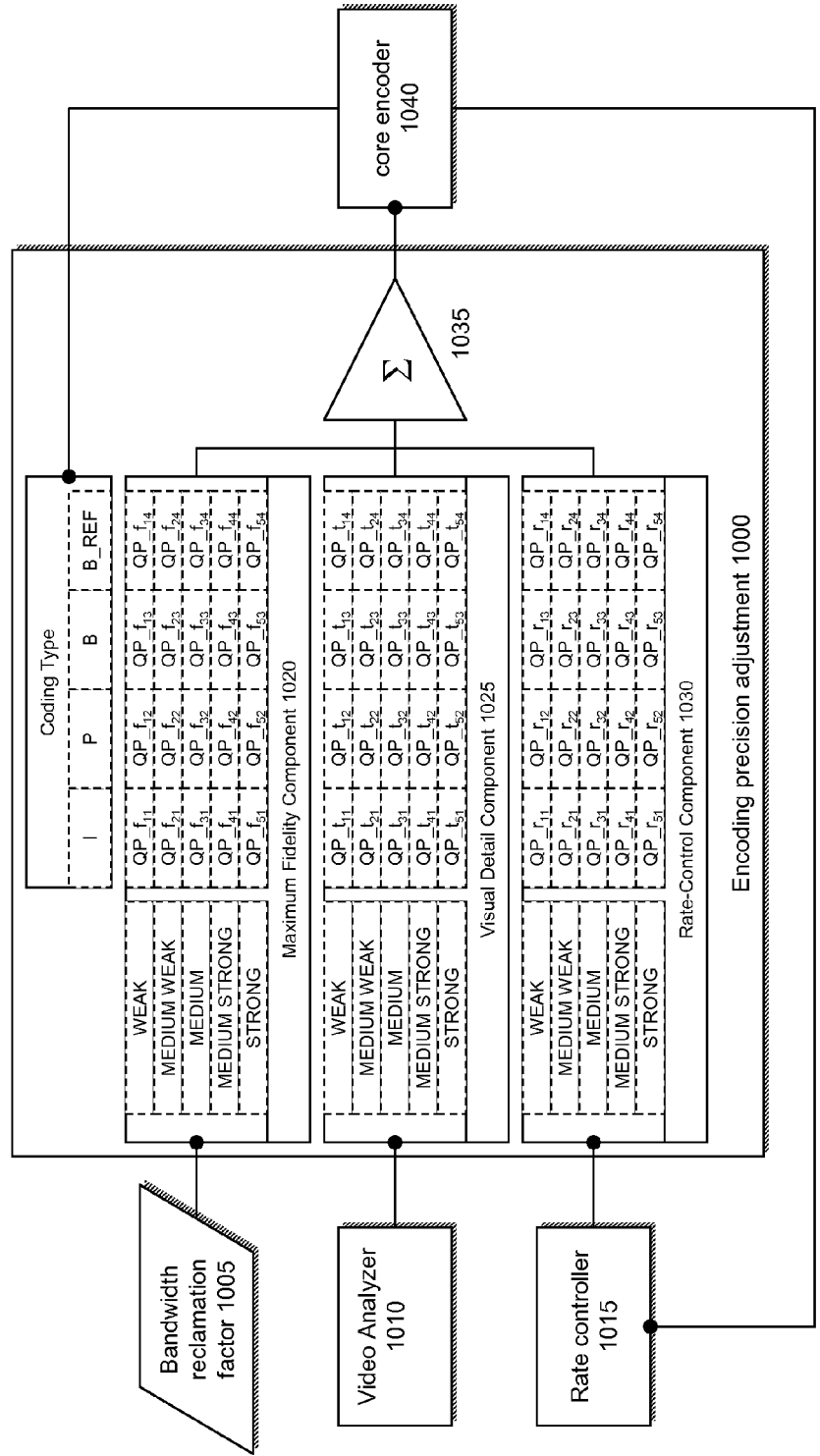
FIG. 10 shows in system block diagram form several aspects of a process in accordance with the invention.

Referring now to FIG. 10, an implementation of an encoding precision adjustment module 1000, as discussed previously, can be better appreciated. In at least some implementations, the encoding precision adjustment module is supplied with several inputs, which can, depending upon the particular implementation, include: bandwidth reclamation factor 1005, video analysis data 1010, rate control data 1015, and picture-type data 1018. While the illustrated example of picture type is particularly appropriate for H.264 and similar codecs which use I, P and B macroblock types, it will be appreciated that other types of data can be used, depending upon the codec and the implementation.

The input data is used to select values from various tables, as illustrated, so as to produce a result that is supplied to other devices or other encoder components, such as: core encoder, preprocessor, rate control, or other components. While the implementation of the encoding precision adjustment module shown in FIG. 10 includes three different tables, Maximum Fidelity 1020, Visual Detail 1025 and Rate Control 1030, each of which can be set to one of five ranges from weak to strong, it will be appreciated that the number of tables will vary with the particular implementation, and the number of available ranges can vary as well depending upon the specific needs of the implementation. The selections from each table are then summed at 1035 and provided to the core encoder 1040.

While FIG. 10 refers to a 'maximum fidelity', it will be appreciated by those skilled in the art that a 'median', 'mean', or any other statistical measure of fidelity can be used if desired for a particular implementation. For example, if it is preferred to use median fidelity, the median fidelity can be determined by encoding the video data and then calculating the median value of the desired fidelity metric over a desired number of sub regions, such as macroblocks. That measured value can then be compared with a target median fidelity, which may be set externally or derived from a bandwidth reclamation setting. If the measured fidelity is greater than the target fidelity, coding precision can be decreased appropriately. Hereinafter, the use of the term 'maximum fidelity' within the description of the invention is intended to and will mean both 'maximum' and all other statistical measures as are appropriate.

Figure 11:
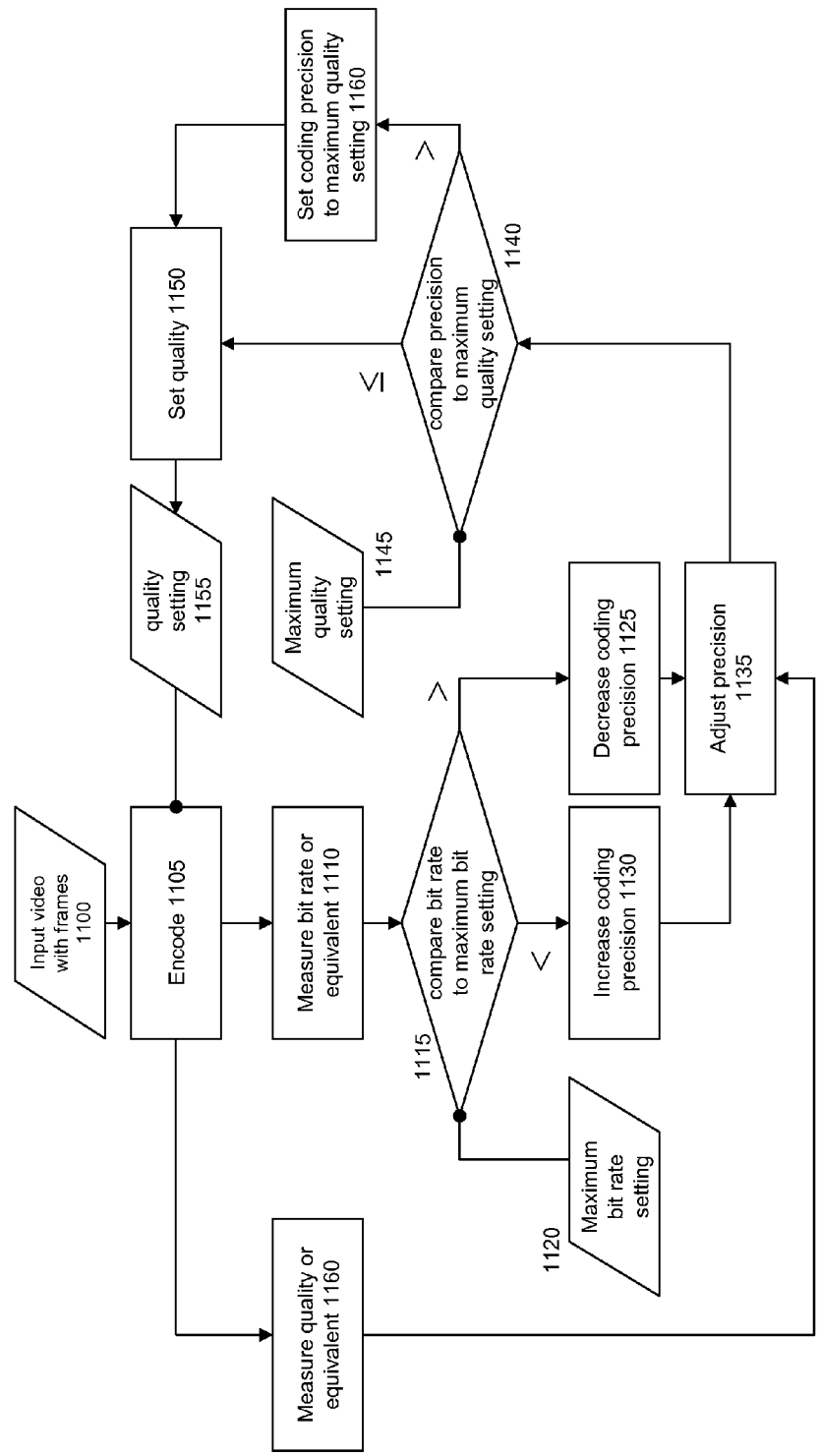
FIG. 11 shows in flow diagram form several aspects of a process in accordance with the invention.

Referring now to FIG. 11, an embodiment of the method of the present invention is shown in flow diagram form. Incoming video stream 1100 is supplied to an encoding step 1105 that produces as its output an output video stream. The output video stream is processed at step 1110 to produce an indicator of video bit rate, which is then compared at step 1115 to a maximum bit rate setting shown at 1120. If an indicator of the video bit rate is greater than the maximum bit rate setting, a signal is sent to decrease target coding precision, shown at step 1125. If the indicator of video bit rate is less than the maximum bit rate setting, a signal is sent at step 1130 to increase target coding precision. The resulting adjusted coding precision, shown at step 1135, is then compared to maximum quality setting as shown at step 1140. If the target coding precision from step 1135 is less than maximum quality setting, taken from 1145, the target coding precision is used to set the quality at steps 1150 and 1155, such that it is supplied as a control parameter to core encoder 1105. However, if the target coding precision is greater than maximum quality setting 1145 when compared at step 1140, the coding precision is set maximum quality setting at step 1160 and is supplied as a control parameter to the core encoder 1105 via steps 1150 and 1155.

Referring again to FIG. 11, it will be appreciated that, in some implementations, the output video stream can be processed to produce an indicator of video quality as shown at step 1160. It will also be appreciated that the indicator of video quality can be processed to produce an indicator of coding precision. It will also be appreciated that the target coding precision can be produced by increasing or decreasing an indicator of video quality, and, for such implementations, the result of step 1160 will be provided as an input to step 1135.

Figure 12:
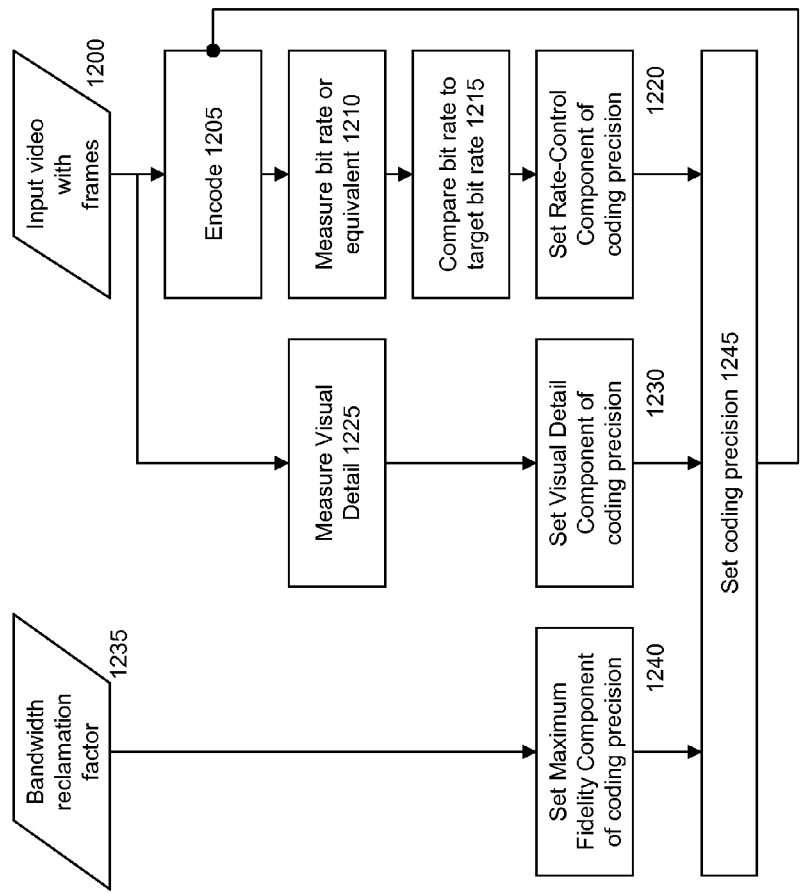
FIG. 12 shows in flow diagram form several aspects of a process in accordance with the invention.

Referring now to FIG. 12, an embodiment of a method of one aspect of the invention can be better appreciated. Incoming video stream 1200 is supplied to a core encoder that produces an output video stream at step 1205. The output video stream is processed to produce an indicator of video bit rate, as shown at step 1210. The indicator of video bit rate is compared to the target bit rate setting by a process and results in a signal by which a rate-control component of coding precision can be set as shown at step 1220. The Incoming video stream is also supplied to a process that produces one or more indicators of visual detail, as shown at step 1225, which serve as inputs to a process by which a visual-detail component of coding precision can be set as shown at step 1230. Additionally, a bandwidth reclamation factor is supplied, as shown at step 1235, to a process 1240 by which a maximum fidelity coding precision component of coding precision can be set. The several components of coding precision are then supplied to a process step 1245 by which encoder coding precision can be set, the result of which is fed back to the encoding step 1205.

Figure 13:
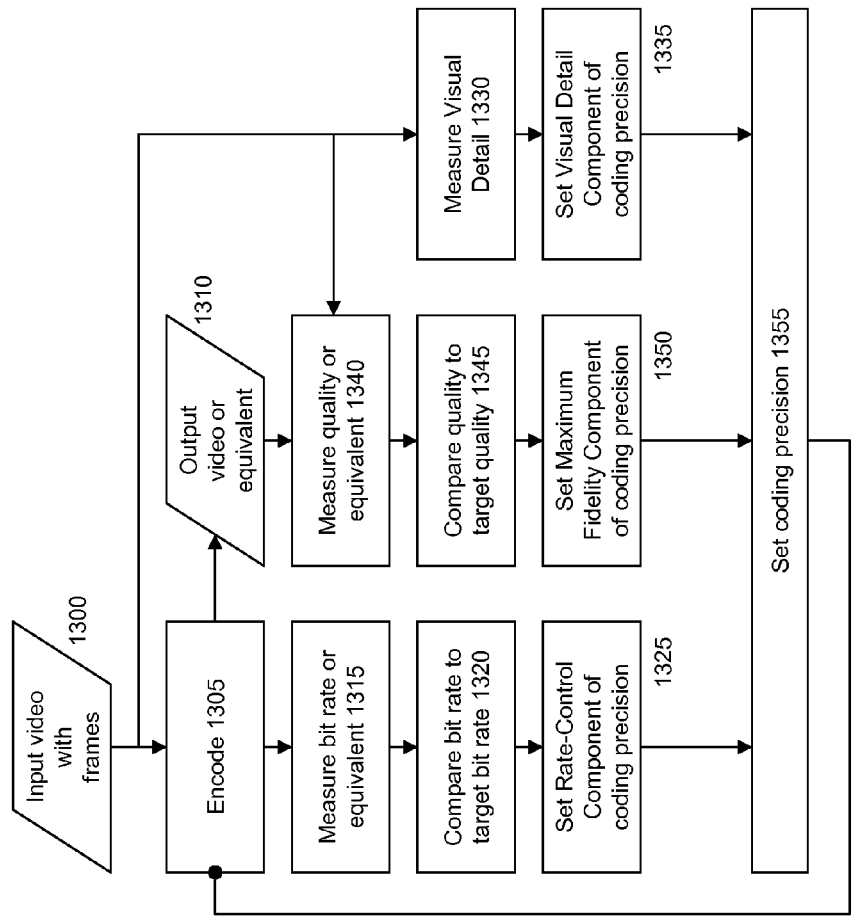
FIG. 13 shows in flow diagram form several aspects of a process in accordance with the invention.

FIG. 13 illustrates in flow diagram form another embodiment of a method of an aspect of the invention. An incoming video stream 1300 is supplied to an encoding step 1305 that produces an output video stream 1310. The output video stream is processed at step 1315 to produce an indicator of video bit rate, which is then compared to a target bit rate at step 1320. The result is supplied to a rate control setting step 1325 which sets a rate-control component of coding precision. In addition, the incoming video stream 1300 is also provided to a process indicated at 1330 that produces one or more indicators of visual detail, which supply a process step 1335 by which a visual-detail component of coding precision can be set. In addition, the output video stream 1310 and the input video stream 1300, or their equivalents, are processed at 1340 to produce one or more indicators of quality. said the resulting quality indicator is compared at 1345 with a target quality to produce a signal by which maximum fidelity component of coding precision can be set as shown at step 1350. The several components of coding precision are supplied to a process step 1355 by which encoder coding precision can be set, and the resulting encoder coding precision is then fed back to the encoding step 1305.

Referring again to FIGS. 11, 12, and 13, it will be appreciated that coding precision can be updated more than once or less than once per picture, or essentially at any suitable rate. Coding precision can be determined and updated at a picture level, frame level, field level, macro block level, sub block level, or any other region of interest. Coding precision can also be updated for each picture, for groups of pictures, or for sequences, continuously, selectively, or intermittently. It will also be appreciated that the core encoder can represent a multi-pass encoder, in which case coding precision can be updated at any stage of coding, and, in such situations, coding precision may be thought of as a look-ahead or feed-forward signal.

Figure 14:
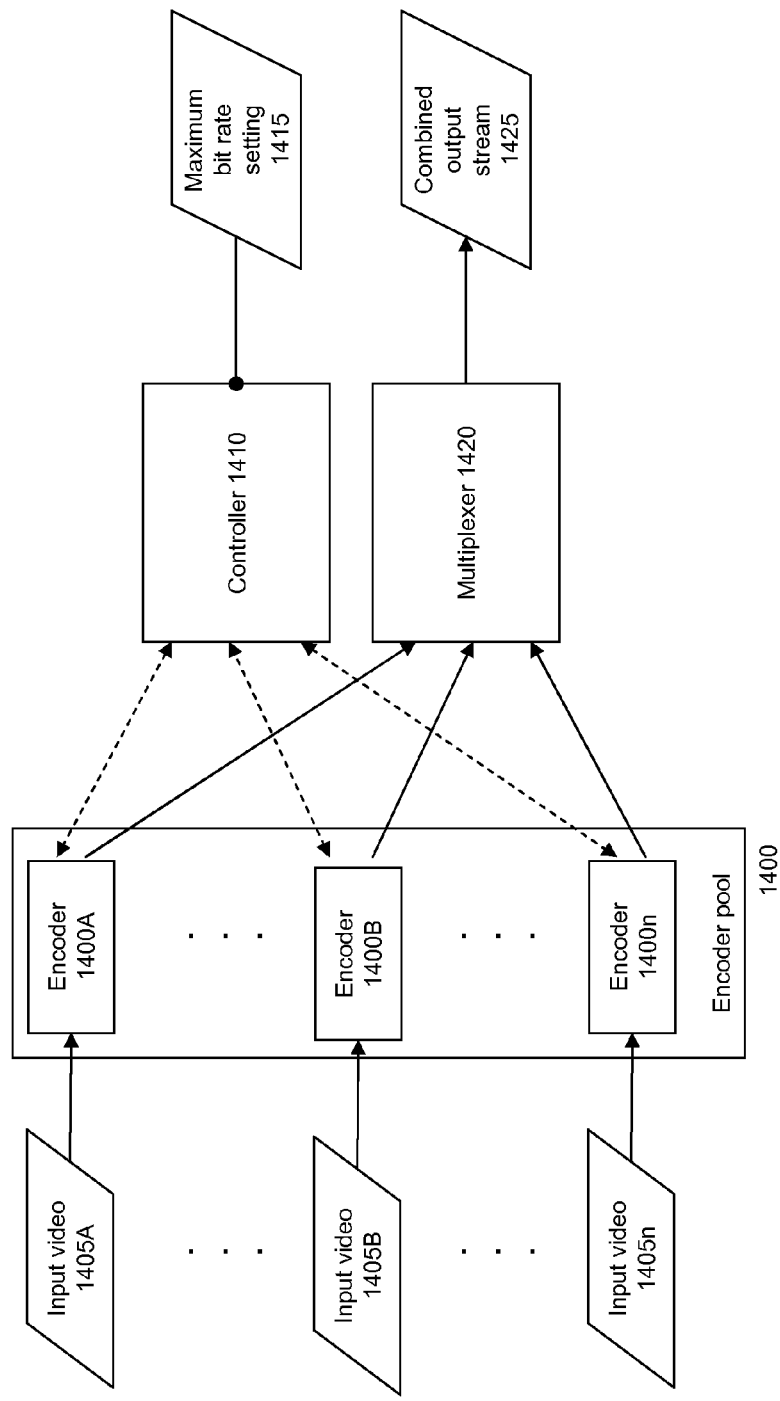
FIG. 14 shows in system block diagram form several aspects of an embodiment of a typical statistical multiplexing system.

Referring now to FIG. 14, there is depicted an embodiment of a statistical multiplexing system in accordance with the invention. In at least some implementations, several encoders 1400A-n may be thought of a comprising a single statistical multiplexing pool 1400. At least two input video streams 1405A-n are supplied to the statistical multiplexing pool 1400. Encoders within the pool can supply data to a controller 1410, which can process the data to produce control data that can be fed back to encoders. The controller 1410 is typically additionally supplied with a maximum bit rate setting 1415. In at least some implementations, such feedback data may be thought of as a maximum bit rate setting for each individual encoder 1400A-n. In some implementations, each encoder 1400A-n is supplied with a maximum bit rate setting, or equivalent. In an exemplary arrangement, each encoder supplies to a multiplexer 1420 an output data stream that typically comprises an output video stream. The multiplexer 1420 combines the streams to produce a single output stream 1425. It will be appreciated that encoders in the statistical multiplexing pool can be physically located in one or more remote locations.

Figure 15:
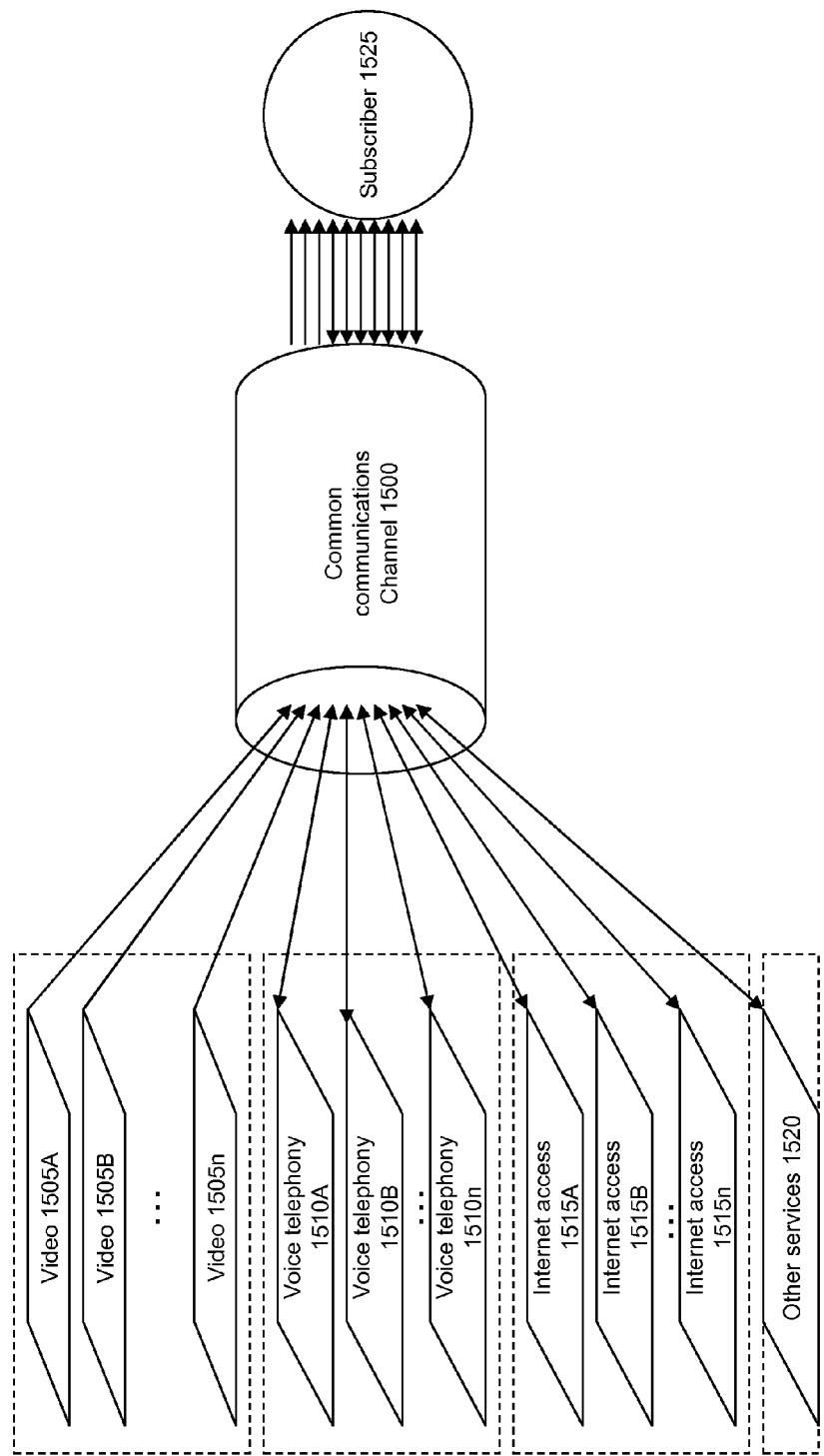
FIG. 15 shows in system block diagram form several aspects of an embodiment of a mixed-media communications system.

FIG. 15 depicts deployment of an embodiment of an aspect of the invention in a mixed-media common channel 1500. In at least some implementations, several media types may be thought of as sharing a common communications channels. The media types can, for example, include video 1505A-n, voice telephony 1510A-n, Internet services 1515A-n, and other services 1520. In at least some implementations, some of these media streams can be implemented as at least two-directional communication links. In an exemplary arrangement, several groups of media stream are supplied to the communications channel 1500, which communicates the streams to one or more subscribers 1525. It will be appreciated that, in at least some implementations, one or more distinct streams of the same media type may be thought of as a group; for example, a video services group It will also be appreciated that, in at least some implementations, one or more distinct streams of diverse media types may be thought of as a group; for example, an individual subscriber services group, which can include some of all of video, telephone, internet access and other services as a single group.

Figure 16:
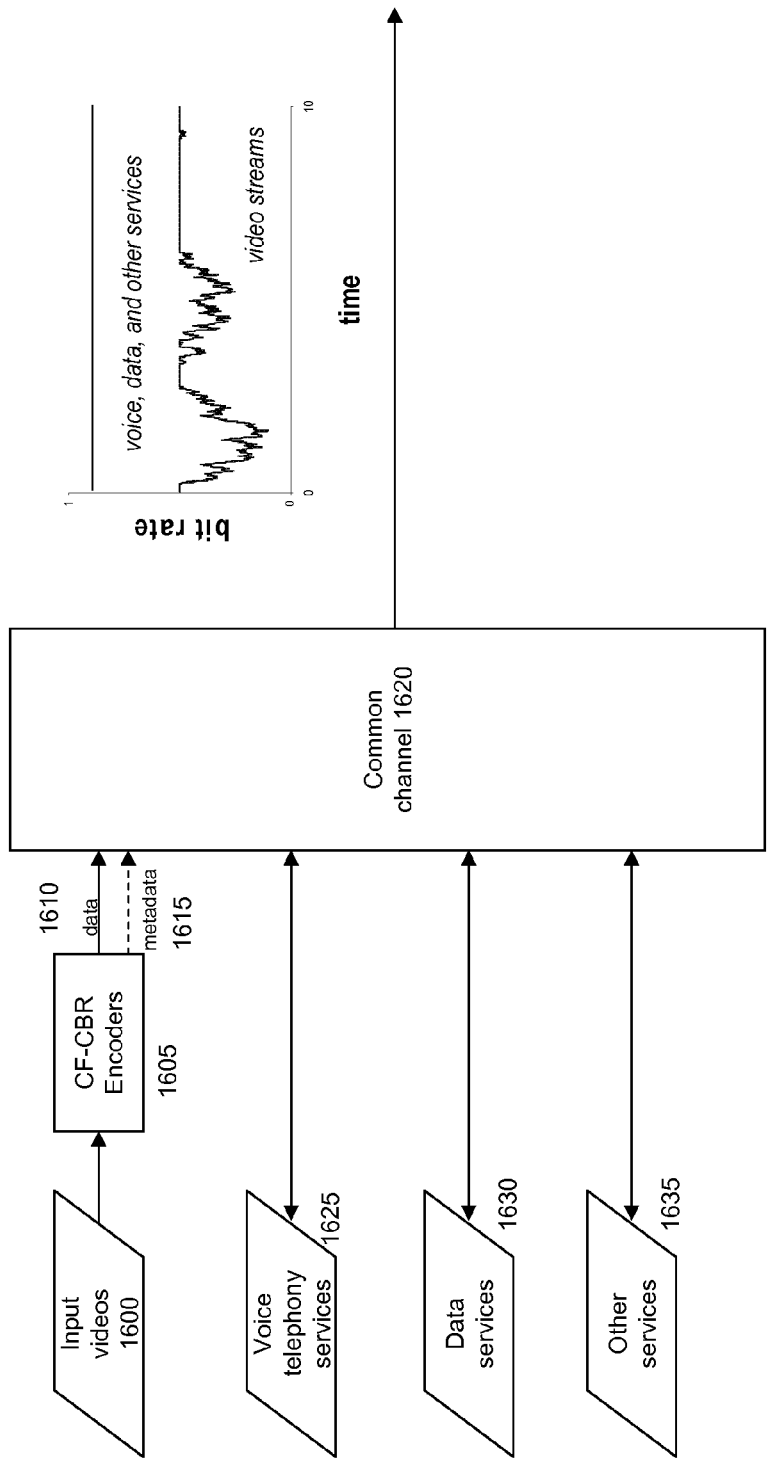
FIG. 16 shows in system block and diagram form several aspects of an embodiment of a system in accordance with the invention.

Referring next to FIG. 16 the deployment of an embodiment of an aspect of the invention in mixed-media common channel, including the provision of meta data can be better appreciated. In at least some implementations, input video 1600 is supplied to an encoding process 1605, which supplies at least one output video stream 1610 and meta data 1615 to a common communications channel 1620, in accordance with the present invention. Voice telephone 1625, data/internet access services 1630, and other services 1635 are typically also supplied to the common channel 1620

Figure 17:
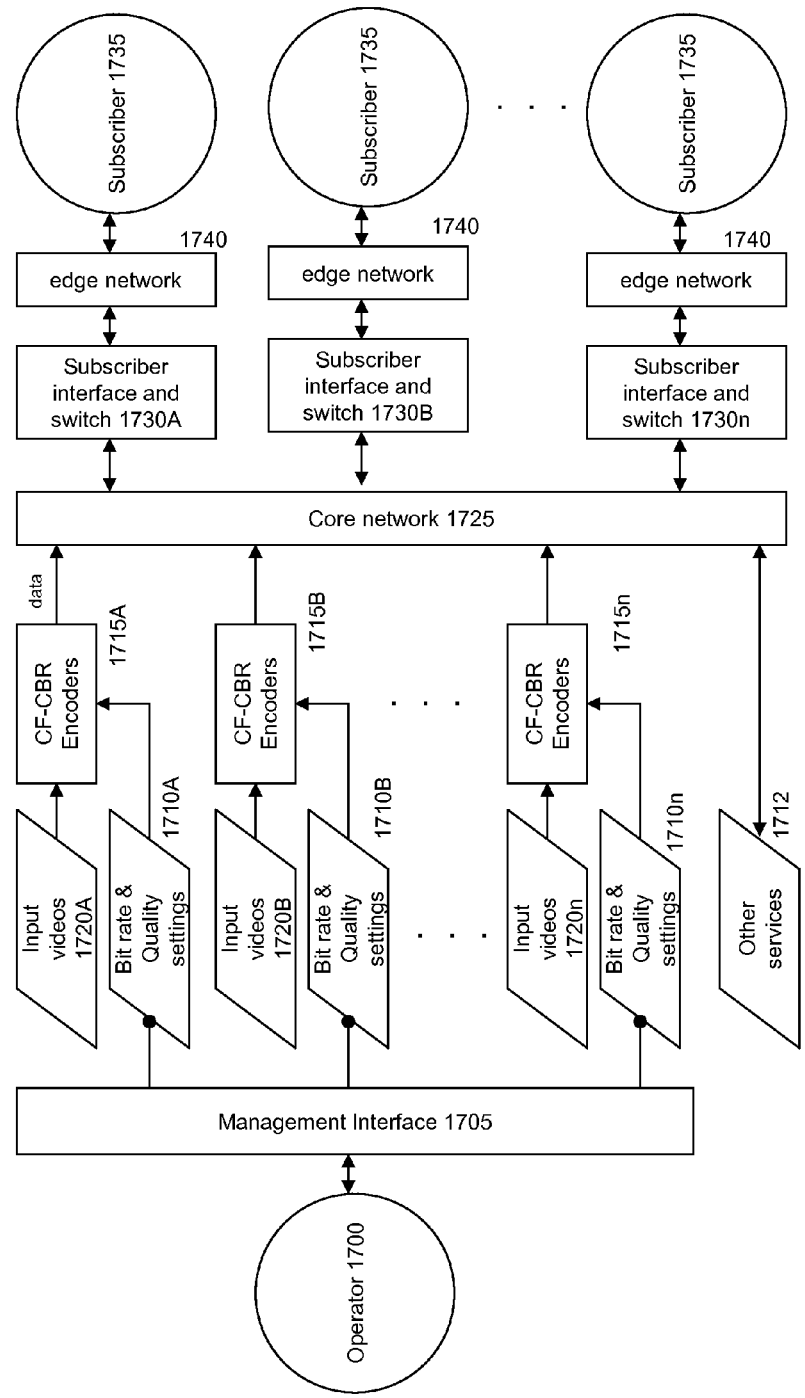
FIG. 17 shows in system block and diagram form several aspects of an embodiment of a system in accordance with the invention.

Referring next to FIG. 17, an aspect of the invention, which relates to centralized management of quality-of-service that is independent of edge networks and subscriber actions, can be better appreciated. An operator 1700 interacts with a management interface 1705, which supplies one or more groups of signals 1710A-n to one or more encoders 1715A-n in accordance with the present invention. Each of the groups of signals 1710A-n can include, for example, bit rate and quality settings, in accordance with the present invention. Other services 1712 can also be provided. It will be appreciated that, in at least some implementations, the management interface 1705 will enable redundancy and fail-over management. Input videos 1720A-n are supplied to encoders 1715A-n, which process the videos and supply signals, such as compressed video data, audio data, meta-data, and other data, to a core or common network 1725, which can include multiplexers, transmission channels, subscriber access management systems, and other communications equipment. The common network connects to a plurality of subscriber interfaces with switches 1730A-n to permit the subscribers 1735 to select from available video streams and associated data. In will be appreciated that, in at least some implementations, the subscriber interface can be located remotely and accessed through an edge network 1740, for example. It will also be appreciated that, in at least some implementations, the subscriber interface can be located near the subscriber.

Figure 18:
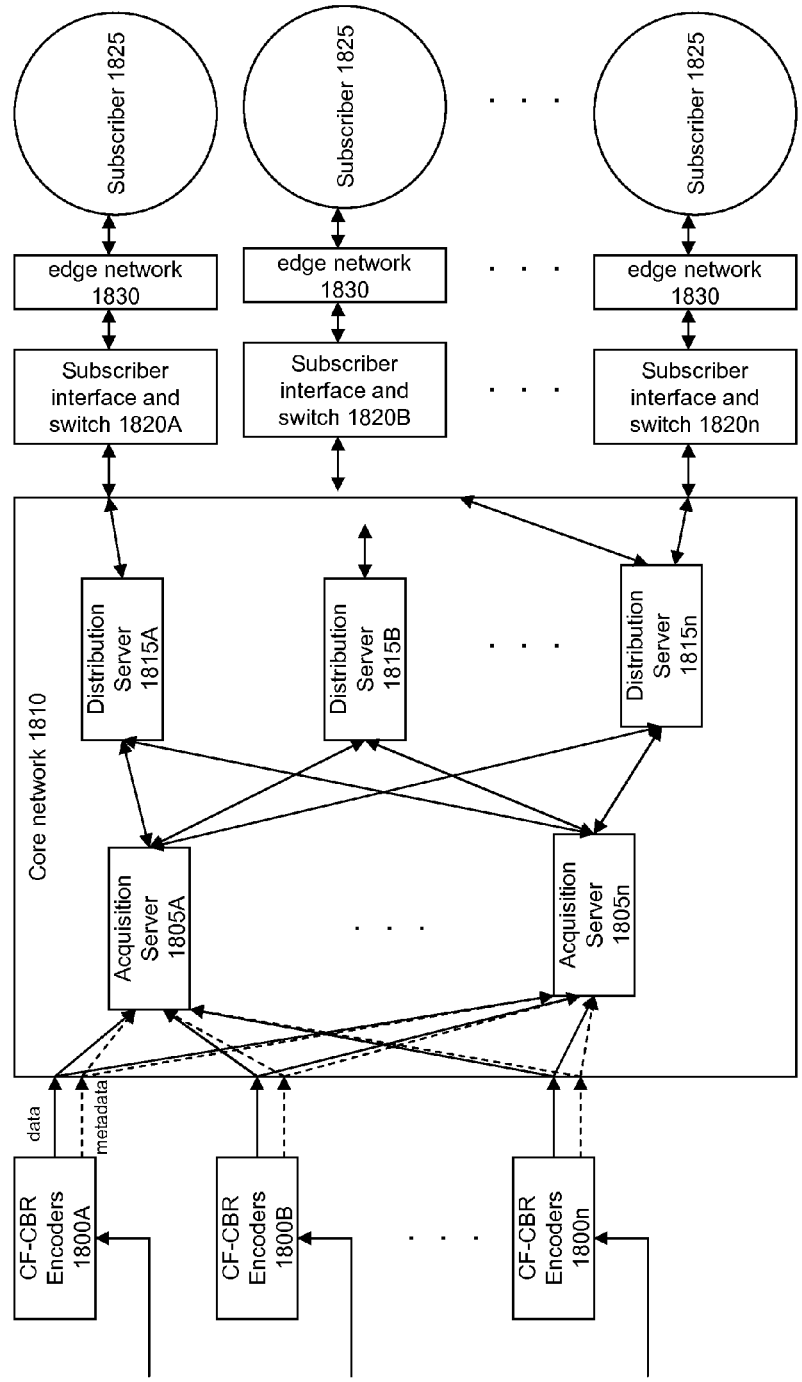
FIG. 18 shows in system block and diagram form several aspects of an embodiment of a system in accordance with the invention.

Turning next to FIG. 18, another aspect of the present invention may be better appreciated. In FIG. 18 is illustrated a system incorporating encoders in accordance with the present invention together with acquisition servers and distribution servers which comprise a portion of a core network. In accordance with the present invention, encoders 1800A-n supply at least video data to one or more acquisition servers 1805A-n which form a portion of a core network 1810. The acquisition servers 1805A-n process the inputs from the encoders and supply signals to distribution servers 1815A-n, which also form a portion of the core network. Each distribution server receives and buffers signals from one or more acquisition servers. In at least some implementations, the distribution servers interfaces bidirectionally with one or more subscriber interfaces and switches 1820A-n. It will be appreciated that signals supplied by a subscriber interface can be processed by the associated distribution server to permit the subscribers 1825 to select particular video streams from those supplied by acquisition servers. As with FIG. 17, in some implementations a series of edge networks 1830 can provide an interface between the subscriber and either a local or remote subscriber interface, although such edge networks are not necessary in all instances. Similarly, in some implementations the subscriber interface can be proximate to the subscriber.

Figure 19:
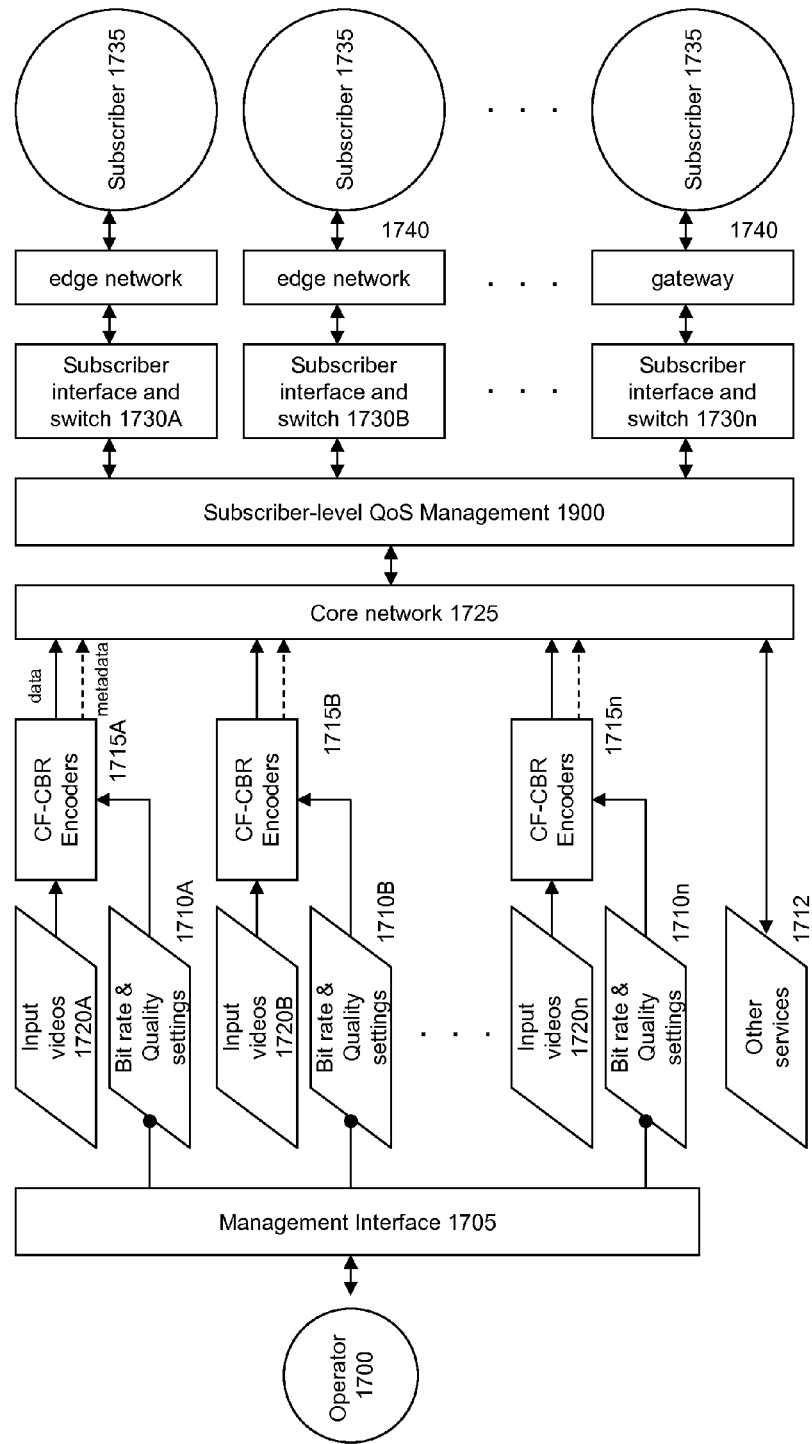
FIG. 19 depicts a system in accordance with another aspect of the invention.

FIG. 19 depicts a system in accordance with another aspect of the invention, wherein the system of FIG. 17 is modified to provide subscriber level quality of service (QoS) management. Elements which have functions substantially like the system of FIG. 17 are shown with like numerals. In accordance with this arrangement of the present invention, the encoders 1715A-n supply at least video data and metadata to a core network 1725. The core network communicates one or more video streams and associated metadata to subscriber-level QoS management 1900, which processes the video data and meta data and supplies subscribers with data streams that can include video data, voice telephony data, internet data, and other data, in accordance with the present invention.

Figure 20:
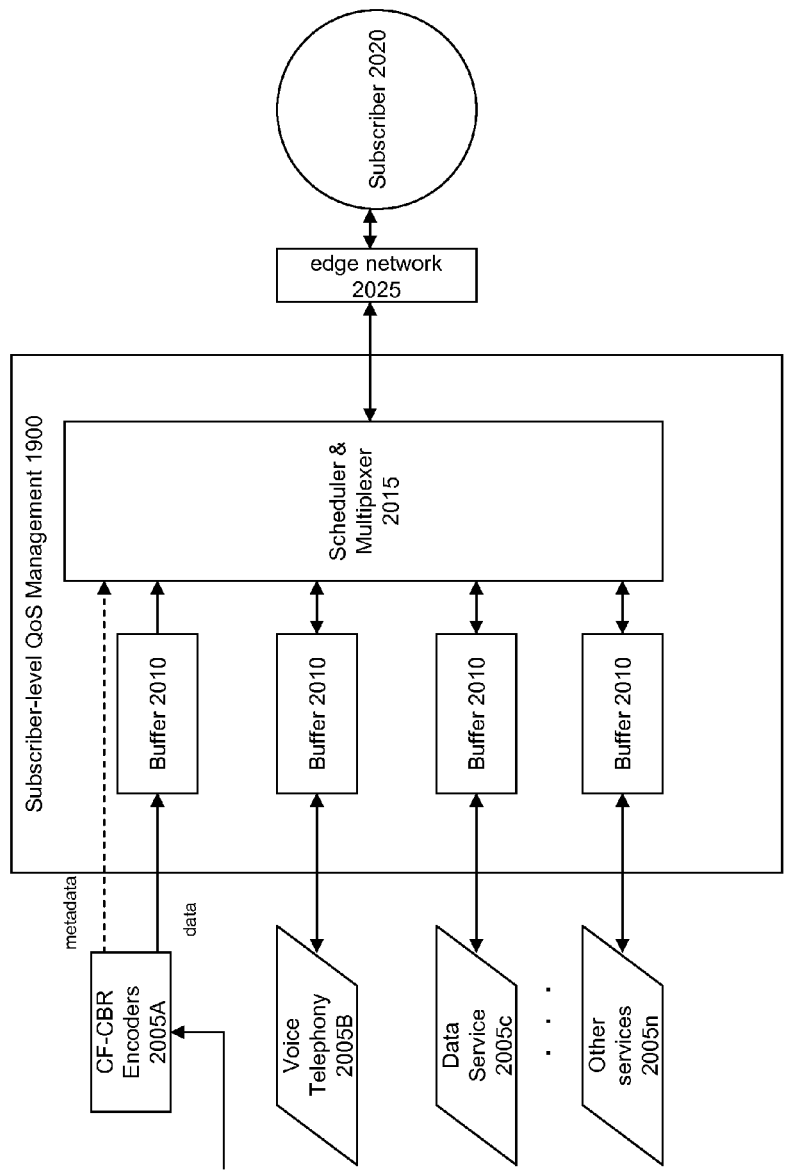
FIG. 20 illustrates a QoS management module in accordance with the principles of the invention.

Referring next to FIG. 20, the subscriber-level QoS management module 1900 of FIG. 19 may be better appreciated. Subscriber-level QoS management processes one or more signals 2005A-n such as video data, voice telephony data, internet data, metadata, and other data. It will be appreciated that, in at least some embodiments, none or more than one signal of the same type can be supplied to subscriber-level QoS management 1900; e.g., several video streams with associated metadata streams. Subscriber-level QoS Management 1900 processes include, depending upon the implementation, buffering as provided by buffers 2010, as well as scheduler and multiplexer 2015, which processes metadata to schedule delivery of the various data services. It will be appreciated that, in at lease some implementations, metadata can supply information about video bit rate in accordance with the present inventions. It will also be appreciated that video bit rate information can be used to schedule transmission of buffered video data in such a way as to achieve a certain video bit rate function over time. It will also be appreciated that video bit rate data can be used to schedule transmission of other buffered data to smooth out total bit rate fluctuations over time, thereby maximizing utilization of channel capacity. The resulting output signals are then provided to the subscribers 2020, which can but need not include one or more edge networks 2025.

The processes described in the present invention may be implemented on one or more computer processors. The processes may be performed as a result of instructions carried on one or more computer readable mediums. Computer readable mediums may include any medium capable of carrying instructions to perform the process, such as a RAM, ROM, storage discs or tape, hard drives, and modulated carrier waves on a transmission medium.

Having fully described several embodiments and a variety of aspects of the invention, including the various systems, apparati, methods and techniques involved, it will be appreciated that the foregoing detailed description is intended to be illustrative only, and the invention is to be limited only by the appended claims.

What is claimed is:

1. An apparatus for managing quality of video services:
  a management interface which is configured to produce at least one bandwidth reclamation factor for one or more video coding units;
  a management network which is configured to convey data from the management interface to the one or more video coding units;
  the one or more video coding units which are constant bit rate and responsive to a bandwidth reclamation factor; and
  a data network which is configured to convey at least video data from the one or more video coding units and a video user,
  wherein the management interface receives one or more video channel quality parameters which indicate at least one of an operator's desired video quality for each channel, or an individual subscriber's desired video quality for each channel, and wherein a bandwidth reclamation factor indicates an amount of bandwidth to be made available on average, and
  wherein the one or more video coding units are configured to produce adaptive bit rate (ABR) chunks and associated metadata.

* * * * *